United States Patent [19]

Casterton et al.

[11] 4,077,490

[45] Mar. 7, 1978

[54] TOTAL POWER FLUID SYSTEM VEHICLE WITH STEERING CONTROL

[75] Inventors: Robert Henry Casterton, Waterloo; Gordon K. Wiegardt, Cedar Falls, both of Iowa

[73] Assignee: Deere & Company, Moline, Ill.

[21] Appl. No.: 787,790

[22] Filed: Apr. 15, 1977

[51] Int. Cl.² .............................................. B62D 11/04
[52] U.S. Cl. ...................................... 180/143; 180/6.3
[58] Field of Search ...................... 180/6.3, 6.48, 140, 180/141, 142, 143, 105 R, 105 E; 60/395

[56] References Cited

U.S. PATENT DOCUMENTS

| | | | |
|---|---|---|---|
| 3,007,655 | 11/1961 | Criswell | 244/50 |
| 3,011,579 | 12/1961 | Milliken | 180/142 |
| 3,166,143 | 1/1965 | Gonter | 180/79.1 |
| 3,175,570 | 3/1965 | Voreaux | 180/6.3 |
| 3,272,277 | 9/1966 | Budzich | 60/395 X |
| 3,888,323 | 6/1975 | Patton | 180/6.3 |
| 3,914,938 | 10/1975 | Cornell | 60/395 |

*Primary Examiner*—Joseph F. Peters, Jr.
*Assistant Examiner*—R. Schrecengost

[57] ABSTRACT

A vehicle with a total power fluid system includes a pair of drive wheels, variable displacement, fluid motors driven by an engine driven, variable displacement, fluid pump. The motor displacements are controlled by operator speed input and speed sensing controls, and the pump displacement is controlled by a pressure sensing pressure control. A vehicle steering control includes an operator steering input control connected to a steerable wheel control for actuating a valve for holding, turning, or castering fluidly steerable wheels which are capable of turning the vehicle. The operator steering input control is further connected to the operator speed input controls to slow the turn-side drive wheel motor during either a steerable wheel controlled or an emergency, drive wheel controlled turn. During either an electrical failure or a hydraulic failure sensed by the inability of the steerable wheels to follow the operator steering input control, the valve will be actuated to caster the steerable wheels. The operator steering input control further includes provisions for greater steering sensitivity near the centered steerable wheel position and for limiting the degree of steerable wheel turn with increasing vehicle speed.

8 Claims, 3 Drawing Figures

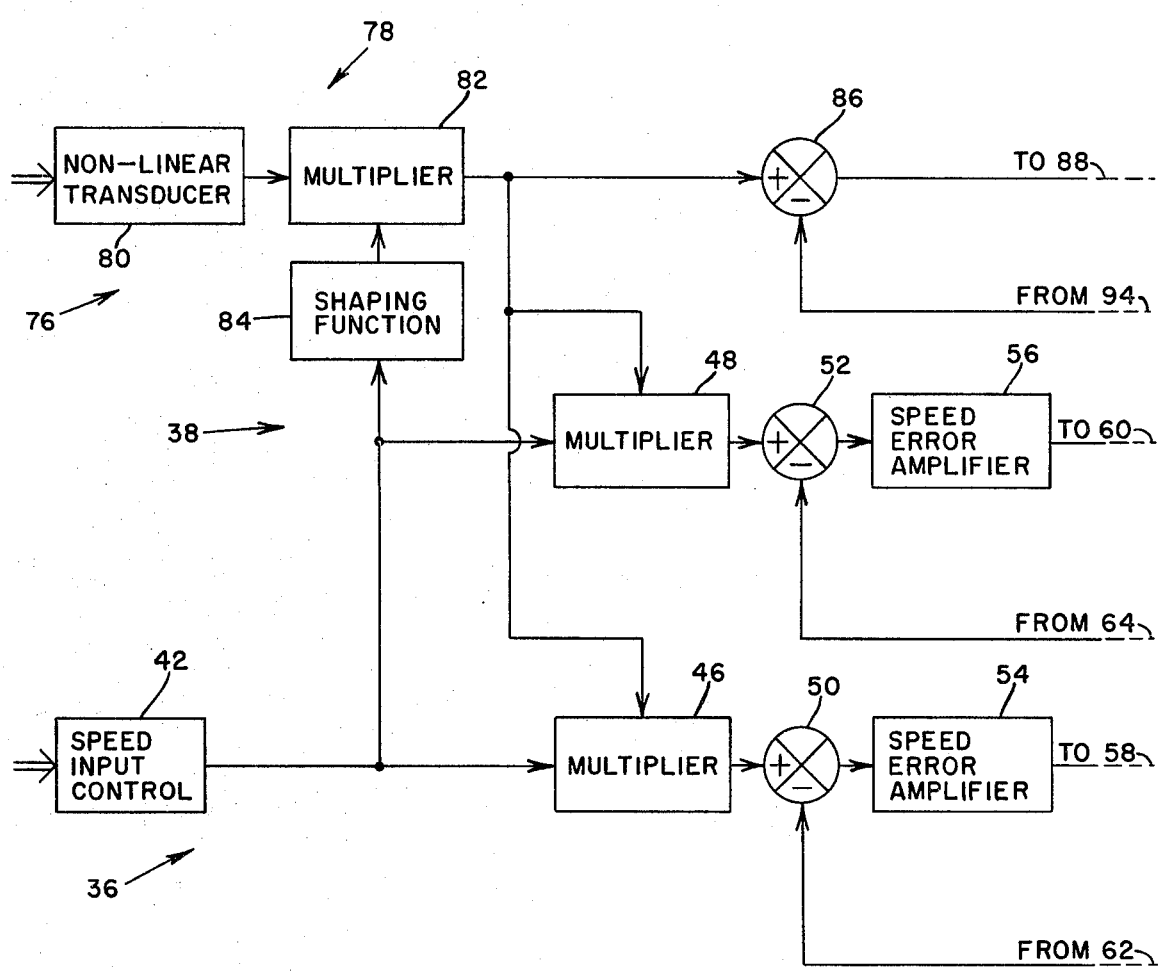
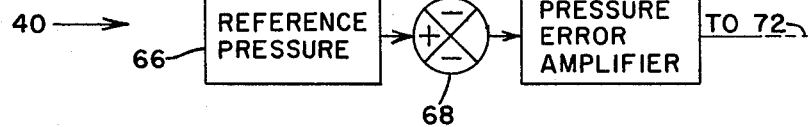
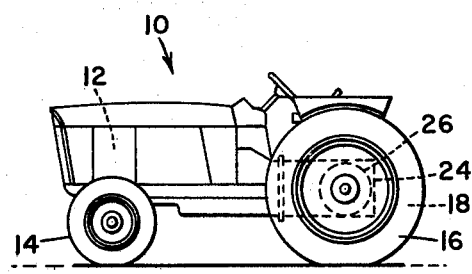
FIG. 3
FIG. 1

TOTAL POWER FLUID SYSTEM VEHICLE WITH STEERING CONTROL

Background of the Invention

The invention relates generally to vehicles with total fluid power systems of the type claimed in co-pending application Ser. No. 787,789, assigned to the same assignee, and more particularly to a steering control incorporated into such a vehicle.

In the past, vehicles having a pair of steerable wheels and a pair of drive wheels would turn by turning the steerable wheels and braking the turn side drive wheel to prevent slipping thereof and to augment the turning effect of the steerable wheels. If the steering control failed, the steerable wheels had to be manually turned.

These vehicles had no provisions for turning the vehicle in response to a single steering input while providing the emergency steering option of steering by speed differential between the drive wheels by input at the operator's steering input control to automatically slow one of the motors to initiate a turn.

Further, these vehicles had no provisions for free castering the steerable wheels upon a failure of the steering control or of the steerable wheels to respond to the steering control.

SUMMARY OF THE INVENTION

The present invention provides a steering control for a vehicle having a total power fluid system. The steering control incorporates valving to hold or turn the steerable wheels during normal operation, or to free caster the steerable wheels upon a failure in the steering control system. The operator steering input control of the steering control is connected to the operator speed input controls for the drive motors so as to direct the turn-side motors to be slowed during a turn. In the event of a failure between the operator steering input control and the steerable wheels, emergency steering is provided by slowing of the turn-side motor, in addition to that available by speed control of both motors, and by castering of the steerable wheels.

The present invention further provides a steering control wherein greater sensitivity is available near the unturned steerable wheel position and wherein the degree of turn of the steerable wheel is increasingly limited with increasing speed.

The above and additional advantages of the present invention will become apparent to those skilled in the art from a reading of the following detailed description when taken in conjunction with the accompanying drawings.

BRIEF DESCRIPTION OF THE DRAWINGS

FIG. 1 is a side view of a vehicle incorporating the total power fluid system with the vehicle steering control of the present invention;

FIG. 3 is a schematic illustration of the remainder of the total power fluid system in which the remainder of the vehicle steering control is shown.

DESCRIPTION OF THE PREFERRED EMBODIMENT

Figure 2:
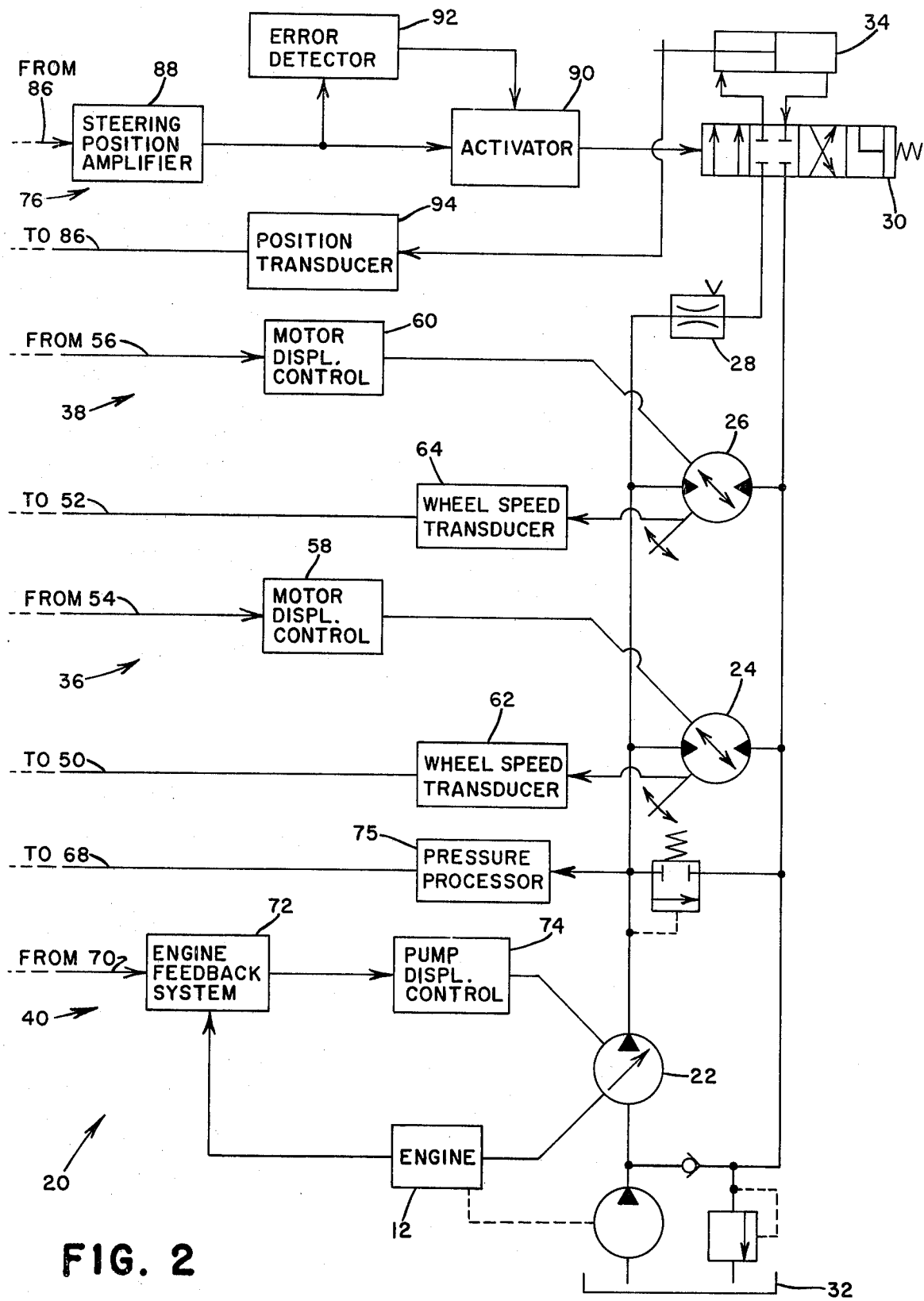
FIG. 2 is a schematic illustration of a portion of the total power fluid system in which the vehicle steering control of the present invention is embodied.

Referring now to FIG. 1, therein is shown a vehicle 10 having an engine 12, a pair of steerable wheels 14, and a pair of drive wheels 16 and 18.

Referring now to FIG. 2, therein is shown a total power fluid system 20 which is disclosed in part in greater detail in co-pending application Ser. No. 787,789 and which is hereby incorporated by reference in this application by reference to said application. The total power fluid system 20 is incorporated in the vehicle 10 with a variable displacement main pump 22 driven by the engine 12. The main pump 22 is fluidly connected to first and second variable displacement fluid motors 24 and 26 which are respectively connected to drive the wheels 16 and 18. The pump 22 is further connected through a flow control valve 28 to a four-position flow control valve 30 which selectively interconnects and blocks the pump 22 and a reservoir 32 to and from a cylinder 34 which operates to turn the steerable wheels 14.

First and second hydraulic wheel motor controls 36 and 38, shown in FIGS. 2 and 3, are connected respectively to the first and second hydraulic wheel motors 24 and 26, and a main pump control 40 is connected to the main pump 22. The first and second motor controls 36 and 38 are generally similar in having an operator speed input control 42 providing forward and reverse speed controls for the vehicle. The operator speed input control 42 is connected to multipliers 46 and 48 which will be described in greater detail later and thence respectively to speed error summing circuitries 50 and 52. The speed error summing circuitries 50 and 52 are connected respectively to speed error amplifiers 54 and 56 and thence to first and second motor displacement controls 58 and 60 which are respectively connected to and control the displacement of the first and second motors 24 and 26. Wheel speed transducers 62 and 64 are respectively operatively connected to the output shafts of the first and second motors 24 and 26 to provide output signals proportional to the speed and direction of rotation of the shafts. The wheel speed transducers 62 and 64 are further connected respectively to the speed error summing circuitries 50 and 52.

Referring now to the main pump control 40, therein is shown a reference pressure circuit 66 which is connected to a pressure error summing circuit 68 which in turn is connected to a pressure error amplifier 70. The pressure error amplifier 70 is connected to an engine feedback system 72 which is responsive to engine speed to decrease pump displacement when the engine 12 becomes overloaded. The engine feedback system 72 is connected to a pump displacement control 74 which controls the displacement of the pump 22. The output pressure of the pump 22 is processed by a pressure processor 75 and inputed to the pressure error summing circuit 68.

Referring now to the vehicle steering controls which are generally indicated by the numeral 76, therein is shown an operator steering input control 78 which includes a nonlinear transducer 80 for receipt of an operator's manual input and a multiplier 82 which is connected thereto. The multiplier 82 is connected by a shaping function circuit 84 to the operator speed input control 42. The output of the multiplier 82 is further connected to the inputs of the multipliers 46 and 48 as well as to the input of position error summing circuitry 86.

The position error summing circuitry 86 is further connected to a steering position amplifier 88 and thence to a conventional actuator system 90 for the valve 30. An error detector 92 is connected to the output of the steering position amplifier 88 and inputs to the actuator system 90. Connected to the cylinder 34 to sense the position thereof is a position transducer 94 which provides an input to the position error summing circuitry 86.

To change the speed of the vehicle 10, the operator sets the operator speed input control 42 to the desired motor speed. This provides an input speed signal for processing by the multipliers 46 and 48, respectively. The processed input speed signals from the multipliers 46 and 48 are then summed respectively in the speed error summing circuitries 50 and 52 with the actual wheel speed signals from the wheel speed transducers 62 and 64, respectively. When the wheel motor speed is being increased, for example, the output of the speed error summing circuitries 50 and 52 will be amplified by the speed error amplifiers 54 and 56 to direct the first and second motor displacement controls 58 and 60, respectively, to increase the displacement of the first and second motors 24 and 26, respectively. As the motor displacements increase, the pressure from the pump 24 decreases and the decrease is sensed by the pressure processor 75.

The pressure processor 75 provides an actual pressure signal proportional to the pressure at the pump 22 to the pressure error summing circuit 68 for comparison with a reference pressure signal from the reference pressure circuit 66. The output from the pressure error summing circuits 68 will be amplified in the pressure error amplifier 70 and sent to the engine feedback system 72. As long as the maximum power output of the engine 12 is not being utilized, the engine feedback system 72 will provide a signal to the pump displacement control 74 to cause the pump displacement to increase and thus increase the flow rate out of the pump 22. With an increased flow to the first and second motors 24 and 26, the motor speeds will be increased to speed up the vehicle.

To steer the vehicle, the operator provides a steering input to the operator steering input control 78. The nonlinear transducer 80 modifies the input to provide a turn signal according to a predetermined nonlinear curve which would provide the equivalent of a variable ratio type steering system. In effect the operator will be given more precise control over the turning closer to the centered position of the steerable wheels 14 when making minor steering adjustments than away from the centered position when making a sharp turn.

The steering input signal from the nonlinear transducer 80 is processed by the multiplier 82 which limits the degree of turn of the steerable wheel 14 as a function of wheel speed. The predetermined curve of the function is established by the shaping function circuitry 84 which receives the speed signals from the operator speed input control 42, and provides a shaped signal to control the multiplier 82. The degree of turn is limited so as to minimize the possibility of the vehicle 10 rolling over from abrupt steering changes at higher speeds.

The output of the multiplier 82 affects the multipliers 46 and 48 which include circuitries responsive to turn signals within predetermined ranges to process the input speed signal from the operator speed input control 42 so as to reduce the processed input speed signal on the turn-side motor to thus provide differential action between the wheels 16 and 18 so as to augment the steerable wheels 14. If there is a failure of the steering control 76 beyond the multipliers 46, 48 and 82, the operator will still have emergency steering control by virtue of this differential wheel speed action. As would be evident to those skilled in the art, the processed input signal for the outside motor could be increased instead or in addition to slowing the turn-side motor.

The output of the multiplier 82 is further provided to the position error summing circuitry 86 which sums the modified steering input signal and the position signal as sensed by the position transducer 94 to provide turn signals to the steering position amplifier 88 and thence to the activator 90 which positions the valve 30 to move the cylinder 34 and thus the steerable wheels 14 which are connected thereto.

The error detector 92 is connected to the steering position amplifier 88 to detect large position error signals which last longer than a predetermined period of time and indicate a failure of the cylinder 34 to follow the command of the operator steering input control 78. When the error detector 92 is activated, it will provide an error detection signal to the activator 90 so as to move the valve 30 to the position wherein the cylinder 34 is connected to the reservoir 32. When both ports of the cylinder 34 are connected to the reservoir 32, the steerable wheel 14 will free caster and turn in the direction of vehicle turn as established by the speed differential of the drive wheels 16 and 18.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. In a vehicle with a total power fluid system having first and second drive wheels respectively driven by first and second variable displacement fluid motors fluidly connected to an engine driven variable displacement fluid pump, a fluid reservoir, pump control means operatively connected to the pump and responsive to the pump outlet pressure to change the displacement of the pump to maintain a predetermined pump outlet pressure at variable outlet fluid flows, operator speed input means providing a speed input signal, first motor displacement means operatively associated with the first motor responsive to the speed input signal and the speed of the first motor to change the displacement thereof proportional to the difference therebetween, second motor displacement means operatively associated with the second motor responsive to the speed input signal and the speed of the second motor to change the displacement thereof proportional to the difference therebetween, a steering control comprising: fluidly steerable wheel means turnable to control the direction of turn of the vehicle, valving means actuable to selectively interconnect the steerable wheel means to the pump and the reservoir to respectively turn and free caster the steerable wheel means and to selectively block the steerable wheel means from the pump and the reservoir to prevent turning of the steerable wheel means; operator steering input means providing turn signals proportional to the desirable degree of wheel means turn; steerable wheel control means operatively associated with the valving means and the operator steering input means responsive to the turn signals to actuate the valve means to turn the steerable wheel means in proportion to the turn signal, to a predetermined value of the turn signal to cause the valving means to block the steerable wheel means from the pump and the reservoir, and to the lack of a turn signal to caster the steerable wheel means by connecting the steerable wheel means to the fluid reservoir; first means interposed in the connection between the operator speed input means and the first motor displacement means responsive to turn signals within a first predetermined range to alter the speed input signal to the first motor displacement means; and second means interposed in the connection between the operator speed input means and the second motor displacement means responsive to turn signals within a second predetermined range to alter the speed input signal to the second motor displacement means whereby a speed differential will be introduced between the first and the second drive wheels to augment the turning of the vehicle by the steerable wheels or will turn the vehicle when the turn signal is lacking indicating a failure in the steerable wheel control means.

2. The steering control as claimed in claim 1 including shaping function means connected to the operator speed input means responsive to a speed input signal within a predetermined range for providing a shaped signal of decreasing value with increasing value of the speed input signal and multiplier means interposed between the operator steering input means and the steerable wheel control means operatively associated with the shaping function means and responsive to the shaped signal to regulate the turn signal in proportion thereto.

3. The steering control as claimed in claim 1 wherein the operator steering input means includes means for regulating the turn signal according to a predetermined curve.

4. The steering control as claimed in claim 1 wherein the steerable wheel control means further includes error detector means responsive to a turn signal of a predetermined prolonged duration indicating a failure of the steerable wheel means to respond to the operator steering input means to provide a deactuation signal to the actuator means and the actuator means includes means responsive to the deactuation signal to cause the valving means to interconnect the steerable wheel means to the reservoir whereby the steerable wheel means will free caster.

5. In a vehicle with a total power fluid system having first and second drive wheels respectively driven by first and second variable displacement fluid motors fluidly connected to an engine driven variable displacement fluid pump, a fluid reservoir, pump control means operatively connected to the pump responsive to pump outlet pressure to change the displacement of the pump to maintain a predetermined pump outlet pressure at variable outlet fluid flows, operator speed input means respectively providing a speed input signal, first motor displacement means operatively associated with the first motor responsive to the speed input signal and the speed of the first motor to change the displacement thereof proportional to the difference therebetween, second motor displacement means operatively associated with the second motor responsive to the speed input signal and the speed of the second motor to change the displacement thereof proportional to the difference therebetween, a steering control comprising: fluidly steerable wheel means turnable from a center direction to a first or second directions to control the direction of turn of the vehicle; valving means connecting the pump and the reservoir to the steerable wheel means actuable from a center position wherein the pump is blocked from the steerable wheel means to a first position wherein the pump is connected to the steerable wheel means to turn it in the first direction and to a second position wherein the pump is connected to the steerable wheel means to turn it in the second direction, said valving means being biased to a third position wherein the reservoir is connected to the steerable wheel means to cause it to free caster; operator steering input means providing a turn signal proportional to the desirable degree of wheel means turn; position transducer means operatively connected to the steerable wheel means providing position signals proportional to the degree of turn of the steerable wheel means; position error summing means operatively connected to the operator steering input means and the position transducer means for summing the turn and position signals and providing first and second actuation signals in response respectively to a turn signal smaller and larger than the position signal; steering actuator means operatively associated with the valving means and the position error summing means for changing the valving means position from a first to a second position in response respectively to a first and second actuation signals; first multiplier means interposed in the connection between the operator speed input means and the first motor displacement means responsive to turn signals within a first predetermined range to decrease the speed input signal to the first motor displacement means; second multiplier means interposed in the connection between the operator speed input means and the second motor displacement means responsive to turn signals within a second predetermined range to decrease the speed input signal to the second motor displacement means whereby the first or second drive wheels will be slowed to augment the turning of the vehicle by the steerable wheel means or will turn the vehicle when the turn signal is lacking indicating a failure of a position error summing means or the steerable wheel actuator means.

6. The steering control as claimed in claim 5 including shaping function means connected to the operator speed input means responsive to a speed input signal within a predetermined range for providing a shaped signal of decreasing value with increasing value of the speed input signal in accordance with a predetermined curve and multipier means interposed between the operator steering input means and the steerable wheel control means operatively associated with the shaping function means and responsive to the shaped signals to decrease the turn signal in proportion thereto whereby less of a turn will be made at high speeds than at lower speeds.

7. The steering control as claimed in claim 5 wherein the operator steering input means includes nonlinear means for regulating the turn signal according to a predetermined curve so as to provide less of a turn signal closer to the centered position with a given operator input than at the first and second positions.

8. The steering control as claimed in claim 5 including error detection means operatively connected to the position error summing means and the steerable actuator means responsive to turn signals of a predetermined prolonged duration to provide a deactuation signal, and means in the steerable wheel actuator means responsive to the deactuation signal to cause the valving means to move to its third position wherein the steerable wheels will be free to caster.

* * * * *